US012804343B2

(12) United States Patent
Li et al.

(10) Patent No.: US 12,804,343 B2
(45) Date of Patent: Nov. 17, 2026

(54) MULTI-CHANNEL AUDIO PROCESSING METHOD, SYSTEM AND STEREO APPARATUS

(71) Applicant: Harman International Industries, Incorporated, Stamford, CT (US)

(72) Inventors: Xiaocheng Li, Shenzhen (CN); Jianwen Zheng, Shenzhen (CN); Shaofu Shih, San Jose, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 208 days.

(21) Appl. No.: 18/690,697

(22) PCT Filed: Sep. 10, 2021

(86) PCT No.: PCT/CN2021/117633

§ 371 (c)(1),
(2) Date: Mar. 8, 2024

(87) PCT Pub. No.: WO2023/035218

PCT Pub. Date: Mar. 16, 2023

(65) Prior Publication Data

US 2024/0388862 A1 Nov. 21, 2024

(51) Int. Cl.
*H04S 5/00* (2006.01)

(52) U.S. Cl.
CPC .......... *H04S 5/005* (2013.01); *H04S 2420/01* (2013.01)

(58) Field of Classification Search
CPC ............................. H04S 5/005; H04S 2420/01
See application file for complete search history.

(56) References Cited

U.S. PATENT DOCUMENTS

2005/0271213 A1 12/2005 Kim
2005/0281408 A1 12/2005 Kim et al.
(Continued)

FOREIGN PATENT DOCUMENTS

WO 20200177095 A1 9/2020

OTHER PUBLICATIONS

Lee Young Woo et al: "Virtual Height Speaker Rendering for Samsung 10.2—Channel Vertical Surround System", AES Convention 131; Oct. 2011, AES, 60 East 42nd Street, Room 2520 New York 10165-2520, USA, Oct. 19, 2011 (Oct. 19, 2011), XP040567597, * sections 3.1-3.2; figures 3-5 *.

*Primary Examiner* — Daniel R Sellers
(74) *Attorney, Agent, or Firm* — Angela M. Brunetti

(57) ABSTRACT

A method for processing multi-channel audio signals, a system for processing multi-channel audio signals and a stereo apparatus comprising such a system. The multi-channel audio processing method comprises: receiving multi-channel audio signals from an external audio source, the multi-channel audio signals comprises a pair of surround channel signals and a pair of top channel signals; applying a crosstalk cancellation process in consideration of a head-related transfer function to the pair of top channel signals, so as to produce a pair of processed top channel signals, the head-related transfer function is configured to provide an elevation angle; mixing the pair of processed top channel signals, respectively, with the pair of surround channel signals, so as to produce a pair of mixed surround channel signals; providing the pair of mixed surround channel signals, respectively, to a pair of surround speakers.

12 Claims, 4 Drawing Sheets

(56) References Cited

U.S. PATENT DOCUMENTS

| | | | | |
|---|---|---|---|---|
| 2007/0154019 | A1* | 7/2007 | Kim | H04R 5/04 381/310 |
| 2017/0325043 | A1* | 11/2017 | Jot | H04S 3/002 |
| 2019/0116445 | A1* | 4/2019 | Gerrard | H04S 7/303 |
| 2020/0177095 | A1 | 6/2020 | Ohno et al. | |
| 2022/0167111 | A1* | 5/2022 | Desloge | H04S 7/303 |

* cited by examiner

MULTI-CHANNEL AUDIO PROCESSING METHOD, SYSTEM AND STEREO APPARATUS

TECHNICAL FIELD

This present disclosure relates to a method for processing multi-channel audio signals, a system for processing multi-channel audio signals and a stereo apparatus comprising such a system.

BACKGROUND

With the development of multi-channel surround sound technologies like Dolby Atmos and DTS: X, multi-channel speaker systems are becoming increasingly popular for consumers. These technologies have their own multi-channel audio encoding techniques that provide multi-channel audio signals, each of which is intended to be provided to and played back by a respective speaker of the multi-channel speaker systems, to provide a good spatial audio resolution as well as a good immersive surround sound experience.

Multi-channel speaker systems are normally named after their speakers or audio channels, such as 5.1/7.1/9.1/5.1.2/7.1.2/9.1.2/5.1.4/7.1.4/9.1.4 speaker systems. For example, a 5.1.2 speaker system is a multi-channel speaker system, with the "5" referring to left, right, center, left surround and right surround speakers and their five corresponding channels, and the "1" referring to a woofer speaker and its corresponding channel, and the "2" referring to left top and right top speakers and their two corresponding channels. Similarly, a 5.1.4 speaker system is a multi-channel speaker system, with the "5" referring to left, right, center, left surround and right surround speakers and their five corresponding channels, and the "1" referring to a low frequency effect speaker and its corresponding channel, and the "4" referring to left top front, right top front, left top rear and right top rear speakers and their four corresponding channels.

With the four top speakers or top channels in the multi-channel speaker system, such as a 5.1.4 or 7.1.4 speaker system, the speaker system can better reproduce height effects and thus provide a better immersive surround sound experience. For example, in some movie scenarios, such as those having a helicopter flying therearound, the 5.1.4 or 7.1.4 speaker system will be able to achieve the full 360-degree surround experience, namely the helicopter completes the full circle with pinpoint accuracy. On the other hand, with 5.1.2 or 7.1.2 speaker systems, due to the lack of the top rear speaker pair, the speaker system can only complete the front 180-degree surround sound. As a result, the helicopter only flies left and right in front of the listener, rather than flies a full circle around the listener as in the 5.1.4/7.1.4 channel speaker systems. Similarly, speaker systems without top speakers such as 5.1/7.1 channel speaker systems may downmix the top channels to the front and surround channels, and thus may not produce the height effects and may deteriorate the surround sound experience.

Therefore, there is a need to achieve a height effect, such as a 360-degree surround height effect, to provide a better surround sound experience, by using a speaker system that does not have a full four top speakers.

There have been attempts to achieve a better spatial audio by means of virtual sound features. Those features are commonly used to compensate for the missing speakers for the 2D listening positions to enhance the surround sound experience. The virtual sound features are achieved by algorithms based on the crosstalk cancellation, which relies on phase alignment at a cost of reduced sweet spot. Namely, when the listener is away from the sweet spot, the virtual effect degrades significantly. In some cases, this will further lead to phase misalignment which results in a deteriorated sound experience and spatial accuracy.

Therefore, there is a need for a better spatial audio by means of virtual sound features, with improved sound effect even when the listener is away from the sweet spot.

SUMMARY OF THE INVENTION

According to one aspect of the disclosure, a multi-channel audio processing method is provided. The multi-channel audio processing method comprises: receiving multi-channel audio signals from an external audio source, the multi-channel audio signals comprises a pair of surround channel signals and a pair of top channel signals; applying a crosstalk cancellation process in consideration of a head-related transfer function to the pair of top channel signals, so as to produce a pair of processed top channel signals, the head-related transfer function is configured to provide an elevation angle; mixing the pair of processed top channel signals, respectively, with the pair of surround channel signals, so as to produce a pair of mixed surround channel signals; providing the pair of mixed surround channel signals, respectively, to a pair of surround speakers.

According to another aspect of the disclosure, a multi-channel audio processing system is provided. The multi-channel audio processing system comprises a processor for performing a multi-channel audio processing method.

According to another aspect of the disclosure, a stereo apparatus is provided. The stereo apparatus comprises: an audio source; a speaker system comprising a plurality of speakers, wherein the plurality of speaker comprises a pair of surround speakers; and a multi-channel audio processing system, the multi-channel audio processing system being configured to receive multi-channel audio signals from the audio source.

Other systems, method, features and advantages of the disclosure will be, or will become, apparent to one with skill in the art upon examination of the following figures and detailed description. It is intended that all such additional systems, methods, features, and advantages be included within this description, be within the scope of the disclosure, and be protected by the following claims.

BRIEF DESCRIPTION OF THE DRAWINGS

The disclosure can be better understood with reference to the flowing drawings and description. The components in the drawings are not necessarily to scale, emphasis instead being placed upon illustrating the principles of the disclosure. Moreover, in the figures, like reference numerals designate corresponding parts throughout the different views.

BRIEF DESCRIPTION OF THE PREFERRED EMBODIMENTS

Figure 1:
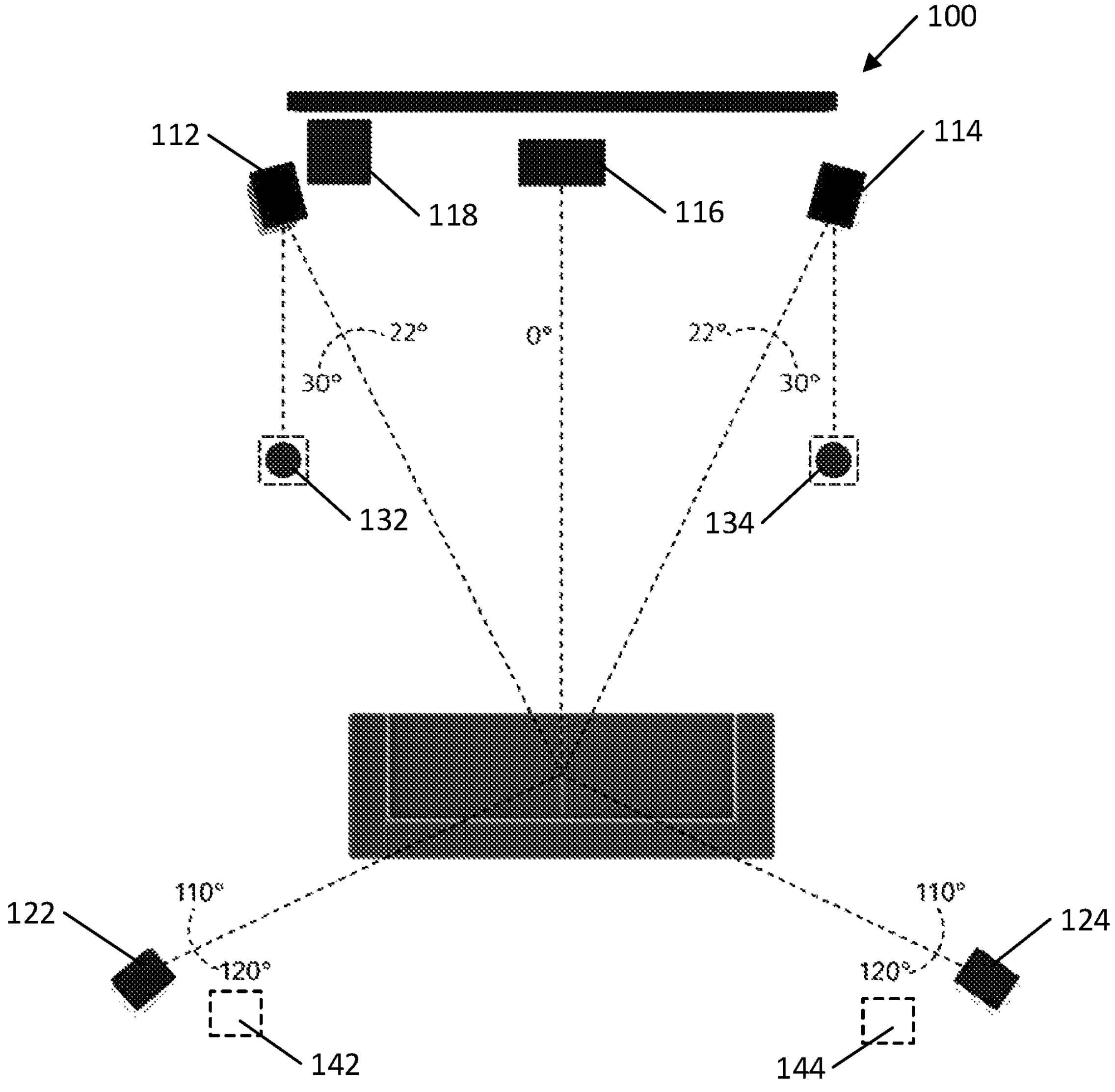
FIG. 1 shows a schematic view of a stereo apparatus 100 according to one or more embodiments of the present disclosure.

Hereinafter, several embodiments of the present disclosure will be described in more detail with reference to the accompanying drawings.

As used herein, the singular forms "a", "an" and "the" are intended to include the plural forms as well, unless the context clearly indicates otherwise. The terms "comprises", "comprising", "includes" and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second etc. may be used herein to describe various elements, components, steps or calculations, these elements, components, steps or calculations should not be limited by these terms, rather these terms are only used to distinguish one element, component, step or calculation from another. For example, a first component could be termed a second component, similarly, a first calculation could be termed a second calculation; similarly a first step could be termed a second step; all without departing from the scope of this disclosure.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The present disclosure provides for a multi-channel audio processing method, a multi-channel audio processing system and a stereo apparatus comprising a multi-channel audio processing system. The multi-channel audio processing method comprises: receiving multi-channel audio signals comprising a pair of surround channel signals and a pair of top channel signals; applying a crosstalk cancellation process and a head-related transfer function to the pair of top channel signals, so as to produce a pair of processed top channel signals; mixing the pair of processed top channel signals with the pair of surround channel signals, and providing the pair of mixed surround channel signals, respectively, to a pair of surround speakers. The head-related transfer function is configured to provide an elevation of 30-60 degrees.

The pair of mixed surround channel signals contains a pair of surround channel signals and a pair of processed top channel signals, and is provided to and played by the pair of surround speakers. The sounds produced by playing back the pair of surround channel signals (hereafter referred to as surround channel sound) are coming from the physical positions of the pair of surround speakers. On the other hand, since the top channel signals have been applied with the crosstalk cancellation process and the head-related transfer function, it has an elevated sound effect as if the sounds produced by playing back the pair of processed top channel signals (hereafter referred to as top channel sounds) are coming from elevated positions relative to the physical positions of the surround speakers. That is, the method of the present disclosure may provide a pair of virtual top speakers at an elevated position relative to the physical positions of the surround speakers.

In one or more embodiments, the method of the present disclosure may provide a pair of virtual top rear speakers for a 5.1.2 or 7.1.2 channel speaker system. That is, the present disclosure may provide a sound effect of a 5.1.4 or 7.1.4 channel speaker system by using a 5.1.2 or 7.1.2 channel speaker system. Thus, the present disclosure may have an advantage of providing a better immersive surround sound experience with reduced cost.

In one or more embodiments of the present disclosure, the method of the present disclosure may be used to retrofit an existing speaker system that does not include a pair of top rear speakers, such as a 5.1.2 or 7.1.2 speaker system, to provide a sound effect of a 5.1.4 or 7.1.4 channel speaker system without rewiring or adding new speakers. This may be particularly advantageous when the existing 5.1.2 or 7.1.2 speaker system is provided in a room where redecoration or rewiring is undesirable.

In one or more embodiments of the present disclosure, the method of the present disclosure may be applied to a 5.1 or 7.1 channel speaker system to provide a pair of virtual top speakers, to provide a sound effect of a 5.1.2 or 7.1.2 speaker system. In one or more embodiments of the present disclosure, the method of the present disclosure may be applied to a 5.1 or 7.1 channel speaker system to provide two pair of virtual top speakers, to provide a sound effect of a 5.1.4 or 7.1.4 speaker system. Moreover, the present disclosure may be applied to either wired speaker system or wireless speaker system.

In one or more further embodiments of the present disclosure, the method further comprises: calibrating the crosstalk cancellation process by adjusting parameters of the crosstalk cancellation process. Calibrating the crosstalk cancellation process may be performed automatically. Calibrating the crosstalk cancellation process may be performed periodically and/or upon an actuation of the user.

With the calibration, the crosstalk cancellation process may be adjusted to accommodate an actual position of the listener so that the listener may still enjoy an improved sound effect even when he or she is away from the original sweet spot of the speaker system. The calibration may be performed automatically and conveniently upon an actuation of the user.

FIG. 1 shows a schematic view of a stereo apparatus 100 according to one or more embodiments of the present disclosure. The stereo apparatus 100 comprises a 5.1.2 speaker system. The 5.1.2 speaker system comprises a left speaker 112, a right speaker 114, a center speaker 116, a woofer speaker 118, a left surround speaker 122, a right surround speaker 124 (the left surround speaker 122 and the right surround speaker 124 may be collectively referred to as a pair of surround speaker), a left top front speaker 132 and a right top front speaker 134. The stereo apparatus 100 further comprises an audio source (not shown in FIG. 1) for providing multi-channel audio signals each for a respective speaker. The stereo apparatus 100 further comprises a multi-channel audio processing system (not shown in FIG. 1) configured to receive audio signals from the audio source. The multi-channel audio processing system is configured to receive at least a left surround channel signal, a right surround channel signal (the left surround channel signal and the right surround channel signal may be collectively referred to as a pair of surround channel signals), a left top rear channel signal and a right top rear channel signal (the a left top rear channel signal and the right top rear channel signal may be collectively referred to as a pair of top rear channel signals) from the audio source. The multi-channel audio processing system applies a virtual algorithm including a crosstalk cancellation process and a head-related transfer function to the left top rear channel signal and the right top rear channel signal and then mix them respectively with the left surround channel signal and the right surround channel signal before providing the mixed audio signals respectively to the left surround speaker and the right surround speaker. The virtual algorithm is configured to provide an elevated sound effect so that the sound is coming from the ceiling, i.e., as if there is a pair of top rear speakers. That is, the virtual algorithm functions to provide a pair of virtual top rear speakers, i.e., a virtual left top rear speaker 142 and a virtual right top rear speaker 144.

Thus, although the stereo apparatus 100 shown in FIG. 1 has only two physical top speakers, i.e., the left top front speaker 132 and the right top front speaker 134, the stereo apparatus 100 can produce a sound effect of four top speakers, i.e., the left top front speaker 132 and the right top front speaker 134 and the virtual left top rear speaker 142 and the virtual right top rear speaker 144. Hence, the present disclosure may achieve a 360-degree surround height effect.

As shown FIG. 1, the multi-channel audio processing system and method of the present disclosure is used in conjunction with a 5.1.2 speaker system. However, the present disclosure is not limited thereto. In one or more embodiments of the present disclosure, the multi-channel audio processing system and method of the present disclosure may be applied to any suitable speaker system, such as a 7.1.2, 9.1.2, 11.1.2, 5.1, 7.1, 9.1 or 11.1 channel speaker system.

Figure 2:
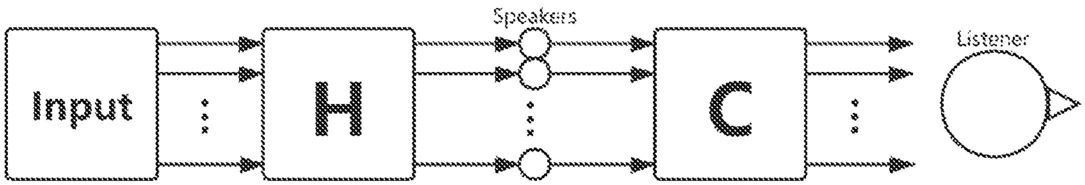
FIG. 2 is a block diagram showing an exemplary crosstalk cancellation (CTC) process.

FIG. 2 is a block diagram showing an exemplary crosstalk cancellation (CTC) process. The input of the process may be any suitable audio input. For example, in the embodiment shown in FIG. 1, the input may be the left top rear channel signal and the right top rear channel signal. C stands for a transfer function between the speaker(s) and the listener. As shown, the input is applied with H, which stands for a crosstalk cancellation function. The crosstalk cancellation function may be defined as below.

$$H = [C^H C]^{-1} C^H$$

Wherein the superscript $^H$ stands for a conjugate transpose operation, the superscript $^{-1}$ stands for an inverse operation.

A head related transfer function (HRTF) may be utilized in connection with the crosstalk cancellation process to provide or enhance the elevated sound effect. A modified transfer function in consideration of the HRTF may be rewritten as follows.

$$H = C_{HRTF} [C^H C]^{-1} C^H$$

where $C_{HRTF}$ stands for a measured HRTF configured to provide an elevation angle. The $C_{HRTF}$ may be measured by using two microphones positioned in a dummy head. The measuring method for a $C_{HRTF}$ is known in the art and the detailed description thereof is omitted. The $C_{HRTF}$ may also be obtained by a numerical simulation.

Figure 3:
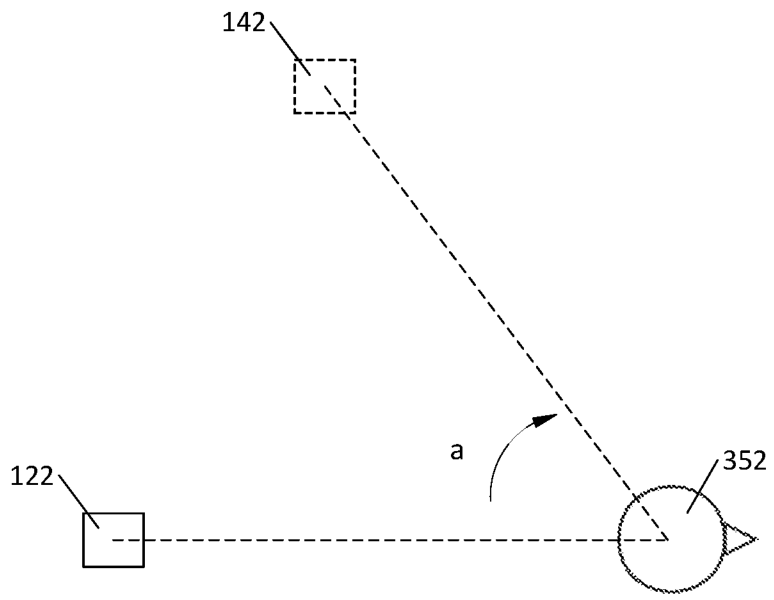
FIG. 3 is a schematic view showing the elevated sound effect of the head related transfer function.

FIG. 3 is a schematic view showing the elevated sound effect of the head related transfer function. The plane of FIG. 3 is substantially perpendicular to the plane of FIG. 1. As shown in FIG. 3, the virtual left top rear speaker 142 has an elevation angle α relative to the left surround speaker 122. That is, an elevation angle (an angle in a vertical direction) α is formed between the line from the listener 352 to the virtual left top rear speaker 142 and the line from the listener 352 to the left surround speaker 122. Similarly, the virtual right top rear speaker 144 also has an elevation angle relative to the right surround speaker 124. That is, the head-related transfer function is configured to provide an elevation angle α.

In one or more embodiments of the present disclosure, the elevation angle may be 30-60 degrees. In one or more embodiments of the present disclosure, the elevation angle may be about 60 degrees. In the embodiments shown in FIG. 1, the HRTF mainly functions to achieve an elevated sound effect. However, the present disclosure is not limited thereto. In one or more further embodiments of the present disclosure, the HRTF may also function to achieve a surround angle, i.e., an angle in the plane of FIG. 1, in addition to the elevation angle.

Figure 4:
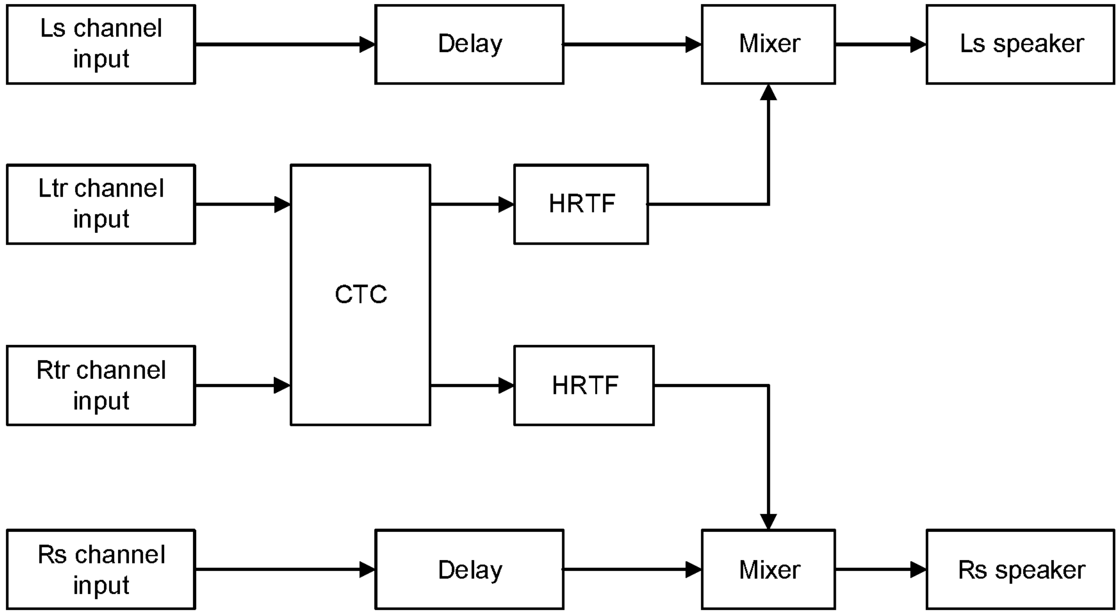
FIG. 4 shows an audio signal processing flowchart of the multi-channel audio processing method according to one or more embodiments of the present disclosure.

FIG. 4 shows an audio signal processing flowchart of the multi-channel audio processing method according to one or more embodiments of the present disclosure. As shown, the process receives multi-channel audio signals from an external audio source. The multi-channel audio signals comprise a left surround (Ls) channel signal, a right surround (Rs) channel signal, a left top rear (Ltr) channel signal and a right top rear (Rtr) channel signal. Then the process applies a crosstalk cancellation process and a head-related transfer function to the left top rear channel signal and the right top rear channel signal. Then the processed left top rear channel signal and the processed right top rear channel signal are mixed with the left surround channel signal and the right surround channel signal, respectively. Then the mixed surround channel signals are provided to the left surround (Ls) speaker and the right surround (Rs) speaker respectively. In one or more embodiments of the present disclosure, the left surround channel signal and the right surround channel signal are delayed to synchronize with processed left top rear channel signal and the processed right top rear channel signal respectively. Although shown in FIG. 4, the step of delay is optional in the present disclosure. In one or more embodiments of the present invention, the step of delay may be omitted. The block "CTC" and the block "HRTF" in FIG. 4 together means the transfer function applied to the Ltr and Rtr channel signals, and may be referred to collectively as a combination of a crosstalk cancellation process and a head-related transfer function or a crosstalk cancellation process in consideration of a head-related transfer function.

Figure 5:
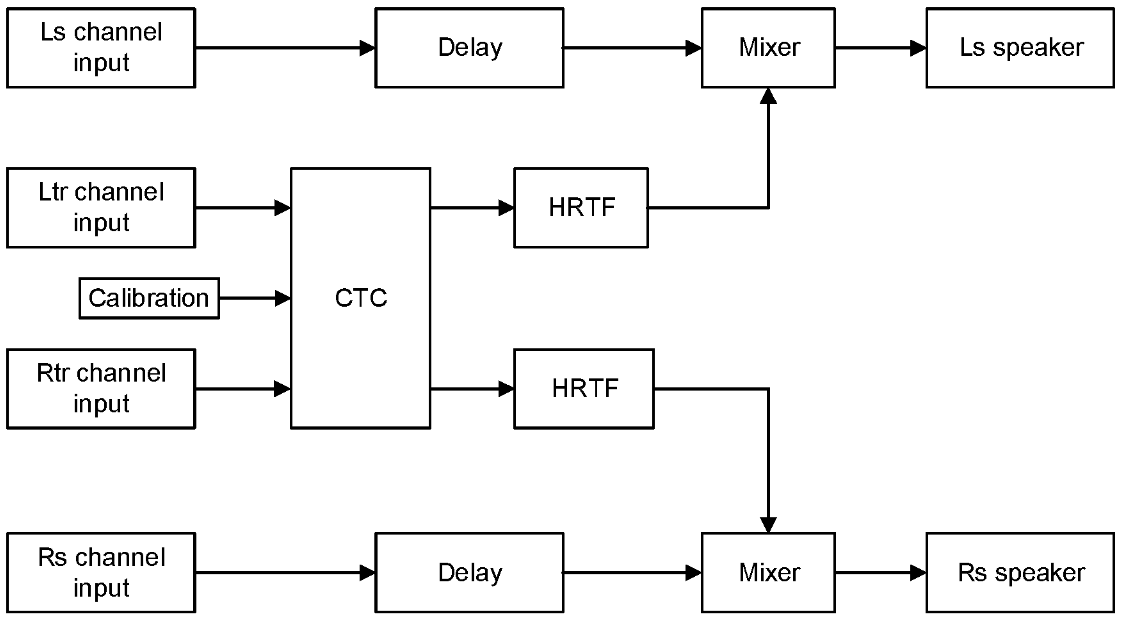
FIG. 5 shows an audio signal processing flowchart of the multi-channel audio processing method according to one or more alternative embodiments of the present disclosure.

FIG. 5 shows an audio signal processing flowchart of the multi-channel audio processing method according to one or more alternative embodiments of the present disclosure. As shown, the multi-channel audio processing method shown in FIG. 5 further comprises a calibration process of calibrating the crosstalk cancellation process by adjusting parameters of the crosstalk cancellation process. In one or more embodiments of the present disclosure, the adjusted parameters comprise a distance and an angle of an intended listener relative to the pair of the surround speakers. The multi-channel audio processing method shown in FIG. 5 is similar to that shown in FIG. 4 except the calibration process, and detailed description thereof is omitted.

Figure 6:
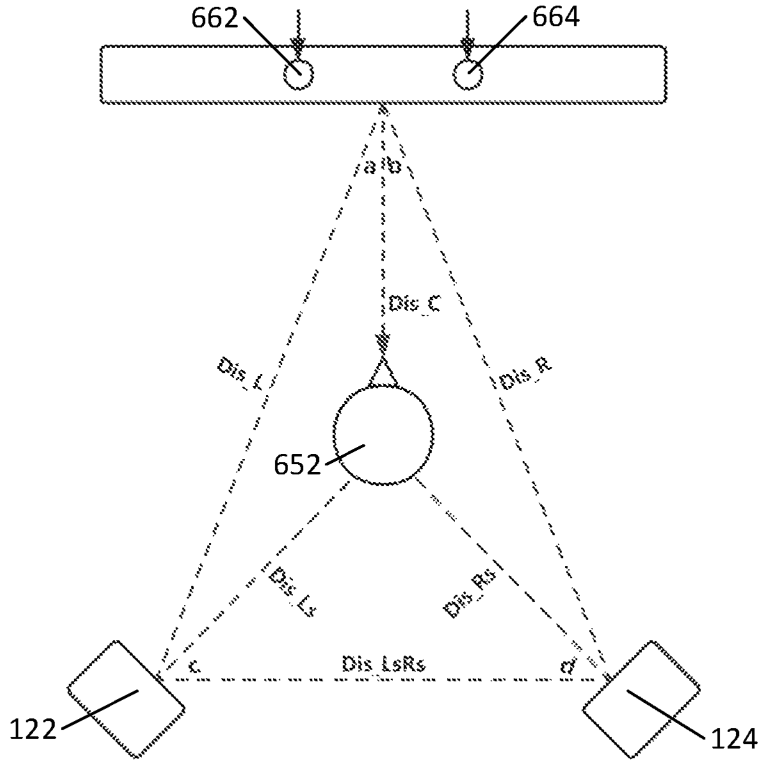
FIG. 6 shows an exemplary calibration process according to one or more embodiments of the present disclosure.

FIG. 6 shows an exemplary calibration process according to one or more embodiments of the present disclosure. The calibration process may be performed automatically upon an actuation of the user. In one or more embodiments of the present disclosure, the calibration process may be started when a button, such as a button on a remote control, is pressed down by a user.

The calibration process may be configured to obtain the distances and angles of an intended listener 652 relative to the surround speakers 122, 124, such as the distances Dis_Ls, Dis_Rs, Dis_LsRs and the angles c, d shown in FIG. 6, and then calibrate the crosstalk cancellation process by using the obtained distances and angles, so as to accommodate the position of the intended listener 652. In this way, the listener 652 may enjoy an improved sound effect even when he or she is away from an original sweet spot of the speaker system. Once the calibration process begins, each of the surround speakers 122, 124 plays a sweep test signal and hence emits a sweep sound, and the microphones 662, 662 receives the sweep sounds. Then the calibration process may obtain or calculate a time period it takes for the sound to travel from the speakers 122, 124 to the microphone 662, 664, and the time difference between the time when the two microphones 662, 664 receives the sound from one speaker. The calibration process then may obtain or calculate the distances and angles of an intended listener 652 relative to the surround speakers 122, 124 based on the obtained time period and time difference, as well as a preset listening distance Dis_C.

Figure 7:
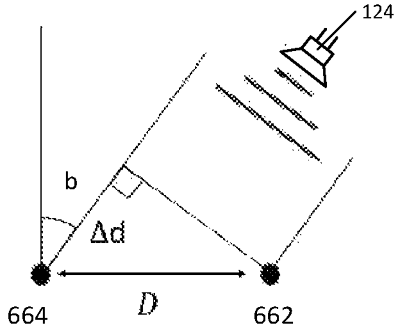
FIG. 7 shows a schematic view about the calculation of the angle b in FIG. 6.

In one or more embodiments of the present disclosure, the distance Dis_L, the distance Dis_R, the angle a and the angle b shown in FIG. 6 may be obtained or calculated by using the time period it takes for the sound to travel from the speakers 122, 124 to the microphone 662, 664 and the time difference between the time when the two microphones 662, 664 receives the sound of a speaker. The angles of the intended listener 652 relative to the surround speakers 122, 124 may be obtained or calculated from the distance Dis_L, the distance Dis_R, the angle a and the angle b. For example, the distance Dis_R may be obtained or calculated by multiplying a sound speed and the time period it takes for the sound to travel from the speakers 124 to the microphone 662, 664. The angle b may be obtained or calculated by using the time difference between the time when the two microphones 662, 664 receives the sound from the speaker 124 (the time difference corresponding to Δd) and the distance D between the two microphones 662, 664, as shown in FIG. 7. The Dis_L and angle a may be obtained in a similar way. Then, the distances Dis_Ls, Dis_Rs, Dis_LsRs and the angles c, d may be obtained or calculated from Dis_L, Dis_R, the angles a, b and the preset listening distance Dis_C by using a geometry method.

In one or more embodiments of the present disclosure, the listening distance Dis_C is a distance value preset by the user. In one or more other embodiments, the listening distance Dis_C may be obtained or calculated in a way similar to the distance Dis_R. In short, a speaker may be placed at the position of the intended listener, and then speaker may emit a sweep sound and the microphones 662, 664 receives the sweep sound. Then the listening distance Dis_C may be obtained or calculated in a similar way as the distance Dis_R.

The calibration process of the present disclosure can be started by the user very easily, such as by a simple press down action of the user on a button. The calibration procedure may be performed completed automatically without any user's intervention. Thus, the user can start the calibration process whenever he or she wants, so that he or she may still be able to enjoy an improved sound effect even when he or she has changed his or her position.

Figure 8:
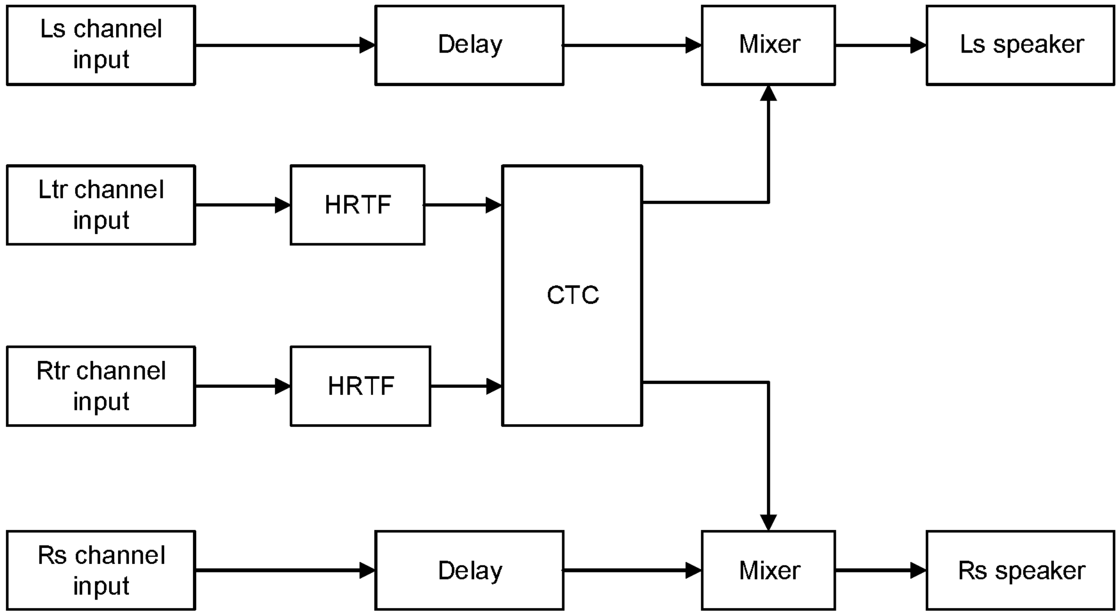
FIG. 8 shows an audio signal processing flowchart of the multi-channel audio processing method according to one or more further embodiments of the present disclosure.

FIG. 8 shows an audio signal processing flowchart of the multi-channel audio processing method according to one or more further embodiments of the present disclosure. The multi-channel audio processing method shown in FIG. 8 is similar to that shown in FIG. 4 except that in the embodiments shown in FIG. 4, the process applies a crosstalk cancellation process and then applies a head-related transfer function to the pair of top rear channel signals, while in the embodiments shown in FIG. 8, the process applies a head-related transfer function and then applies a crosstalk cancellation process to the pair of top rear channel signals, and detailed description thereof is omitted. Although FIGS. 4 and 8 shows embodiments of the combination of the crosstalk cancellation process and the head-related transfer function, the present disclosure is not limited thereto, and the crosstalk cancellation process and the head-related transfer function may be applied in any suitable combination. For example, the modified transfer function in consideration of the head-related transfer function may be defined as one of the followings.

$$H = C_{HRTF}\left[C^H C\right]^{-1} C^H;$$

$$H = \left[C^H C\right]^{-1} C^H C_{HRTF};$$

$$H = \left[C^H C\right]^{-1} C_{HRTF} C^H.$$

Moreover, the calibration process shown in FIGS. 5-9 may be applied to any of the combination of the crosstalk cancellation process and the head-related transfer function.

According to some embodiments of the disclosure, the present disclosure can be implemented as follows.

Item 1: a multi-channel audio processing method, comprising:

receiving multi-channel audio signals from an external audio source, the multi-channel audio signals comprise a pair of surround channel signals and a pair of top channel signals;

applying a crosstalk cancellation process in consideration of a head-related transfer function to the pair of top channel signals, to produce a pair of processed top channel signals, the head-related transfer function is configured to provide an elevation angle;

mixing the pair of processed top channel signals, respectively, with the pair of surround channel signals, to produce a pair of mixed surround channel signals;

providing the pair of mixed surround channel signals, respectively, to a pair of surround speakers.

Item 2: the multi-channel audio processing method according to Item 1, wherein the head-related transfer function is configured to provide an elevation of 30-60 degrees.

Item 3: the multi-channel audio processing method according to any of Items 1-2, wherein the crosstalk cancellation process in consideration of the head-related transfer function may be defined as one of the followings:

$$H = C_{HRTF}\left[C^H C\right]^{-1} C^H;$$
$$H = \left[C^H C\right]^{-1} C^H C_{HRTF};$$
$$H = \left[C^H C\right]^{-1} C_{HRTF} C^H,$$

wherein H stands for the crosstalk cancellation process in consideration of the head-related transfer function, $C_{HRTF}$ stands for the head-related transfer function, C stands for a transfer function between speaker(s) and a listener, the superscript $^H$ stands for a conjugate transpose operation, and the superscript $^{-1}$ stands for an inverse operation.

Item 4: the multi-channel audio processing method according to any of Items 1-3, further comprising:

calibrating the crosstalk cancellation process by adjusting parameters of the crosstalk cancellation process, wherein the parameters comprise a distance and an angle of an intended listener position relative to the pair of the surround speakers.

Item 5: the multi-channel audio processing method according to any of Items 1-4, wherein calibrating the crosstalk cancellation process is performed automatically.

Item 6: the multi-channel audio processing method according to any of Items 1-5, wherein calibrating the crosstalk cancellation process is performed upon an actuation of the user.

Item 7: the multi-channel audio processing method according to any of Items 1-6, wherein multi-channel audio signals comprise 5.1.4 or 7.1.4 channel audio signals, and the pair of top channel signals is a pair of top rear channel signals.

Item 8: the multi-channel audio processing method according to any of Items 1-7, further comprising:

delaying the pair of surround channel signals to synchronize with the pair of processed top channel signals prior to the mixing.

Item 9: a multi-channel audio processing system, comprising a processor for performing a method according to any of Items 1-8.

Item 10: A stereo apparatus, comprising: an audio source; a speaker system comprising a plurality of speakers, wherein the plurality of speaker comprises a pair of surround speakers; and a multi-channel audio processing system according to Item 9, the multi-channel audio processing system being configured to receive multi-channel audio signals from the audio source.

Item 11: the stereo apparatus according to Item 10, wherein the speaker system is a 5.1.2 speaker system or a 7.1.2 speaker system, wherein the pair of top channel signals is a pair of top rear channel signals, and the speaker system does not comprise a top rear speaker.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Systems and methods have been described in general terms as an aid to understanding details of the disclosure. In some instances, well-known structures, materials, and/or operations have not been specifically shown or described in detail to avoid obscuring aspects of the disclosure. In other instances, specific details have been given in order to provide a thorough understanding of the disclosure. One skilled in the relevant art will recognize that the disclosure may be embodied in other specific forms, for example to adapt to a particular system or apparatus or situation or material or component, without departing from the spirit or essential characteristics thereof. Therefore, the disclosures and descriptions herein are intended to be illustrative, but not limiting, of the scope of the disclosure. Accordingly, the disclosure is not to be restricted except in light of the attached claims and their equivalents.

The invention claimed is:

1. A multi-channel audio processing method, the method comprising the steps of:

receiving multi-channel audio signals from an external audio source, the multi-channel audio signals comprise a pair of surround channel signals and a pair of top channel signals;

calibrating the crosstalk cancellation process by adjusting parameters of the crosstalk cancellation process, wherein the calibrating comprises obtaining a distance and an angle of an intended listener position relative to the pair of surround speakers, and the parameters comprise the obtained distance and the obtained angle of an intended listener position relative to the pair of the surround speakers;

applying the calibrated crosstalk cancellation process in consideration of a head-related transfer function to the pair of top channel signals, to produce a pair of processed top channel signals, the head-related transfer function is configured to provide an elevation angle;

mixing the pair of processed top channel signals, respectively, with the pair of surround channel signals, to produce a pair of mixed surround channel signals;

and providing the pair of mixed surround channel signals, respectively, to a pair of surround speakers.

2. The multi-channel audio processing method according to claim 1, wherein the head-related transfer function is configured to provide an elevation angle of 30-60 degrees.

3. The multi-channel audio processing method according to claim 1, wherein the crosstalk cancellation process in consideration of the head-related transfer function is defined as one of the following:

$$H = C_{HRTF}[C^H C]^{-1} C^H;$$

$$H = [C^H C]^{-1} C^H C_{HRTF};$$

$$H = [C^H C]^{-1} C_{HRTF} C^H,$$

wherein H stands for the crosstalk cancellation process in consideration of the head-related transfer function, $C_{HRTF}$ stands for the head-related transfer function, C stands for a transfer function between speaker(s) and a listener, the superscript $^H$ stands for a conjugate transpose operation, and the superscript $^{-1}$ stands for an inverse operation.

4. The multi-channel audio processing method according to claim 1, wherein the step of calibrating the crosstalk cancellation process is performed automatically.

5. The multi-channel audio processing method according to claim 4, wherein the step of calibrating the crosstalk cancellation process is performed upon an actuation by a user.

6. The multi-channel audio processing method according to claim 1, wherein multi-channel audio signals comprise 5.1.4 or 7.1.4 channel audio signals, and the pair of top channel signals is a pair of top rear channel signals.

7. The multi-channel audio processing method according to claim 1, further comprising the step of:

prior to the step of mixing, delaying the pair of surround channel signals to synchronize with the pair of processed top channel signals.

8. A stereo apparatus, comprising:

an audio source;

a speaker system comprising a plurality of speakers, wherein the plurality of speakers comprises a pair of surround speakers; and a multi-channel audio processing system having a non-transitory computer readable medium, the multi-channel audio system being configured to receive multi-channel audio signals from the audio source and the non-transitory computer readable medium having computer executable instructions which, when executed by a computer, cause the computer to perform a method comprising the steps of:

receiving multi-channel audio signals from an external audio source, the multi-channel audio signals comprise a pair of surround channel signals and a pair of top channel signals;

calibrating the crosstalk cancellation process by adjusting parameters of the crosstalk cancellation process, wherein the calibrating comprises obtaining a distance and an angle of an intended listener position relative to the pair of surround speakers, and the parameters comprise the obtained distance and the obtained angle of an intended listener position relative to the pair of the surround speakers;

applying the calibrated crosstalk cancellation process in consideration of a head-related transfer function to the pair of top channel signals, to produce a pair of processed top channel signals, the head-related transfer function is configured to provide an elevation angle;

mixing the pair of processed top channel signals, respectively, with the pair of surround channel signals, to produce a pair of mixed surround channel signals; and providing the pair of mixed surround channel signals, respectively, to a pair of surround speakers.

9. The stereo apparatus according to claim 8, wherein:

the speaker system is a 5.1.2 speaker system or a 7.1.2 speaker system;

the pair of top channel signals is a pair of top rear channel signals; and the speaker system does not comprise a top rear speaker.

10. The stereo apparatus according to claim 8, wherein the head-related transfer function is configured to provide an elevation angle of 30-60 degrees.

11. The stereo apparatus according to claim 8, wherein the crosstalk cancellation process in consideration of the head-related transfer function is defined as one of the following:

$$H = C_{HRTF}[C^H C]^{-1} C^H;$$

$$H = [C^H C]^{-1} C^H C_{HRTF};$$

-continued $$H=\left[C^{H}C\right]^{-1}C_{HRTF}C^{H},$$

wherein H stands for the crosstalk cancellation process in consideration of the head-related transfer function, $C_{HRTF}$ stands for the head-related transfer function, C stands for a transfer function between speaker(s) and a listener, the superscript $^{H}$ stands for a conjugate transpose operation, and the superscript $^{-1}$ stands for an inverse operation.

12. The multi-channel audio processing system according to claim 8, wherein prior to the step of mixing, the multi-channel audio system is further configured to perform the step of delaying the pair of surround channel signals to synchronize with the pair of processed top channel signals.

* * * * *